Nov. 1, 1949.   C. C. COATS   2,486,635
LURE ATTACHING CLIP
Filed Jan. 20, 1947

INVENTOR.
Cecil C. Coats
BY
ATTYS

Patented Nov. 1, 1949

2,486,635

UNITED STATES PATENT OFFICE 2,486,635

LURE ATTACHING CLIP

Cecil C. Coats, Chico, Calif.

Application January 20, 1947, Serial No. 722,984

2 Claims. (Cl. 43—28)

This invention is directed to an improved fisherman's device.

In particular the invention is directed to, and it is an object to provide a novel clip unit for releasably attaching lures, such as spoons or spinners, to a leader shank.

Another object of the invention is to provide a lure attaching clip unit, as above, which includes novel means preventing accidental release of the lure supporting spring finger.

A further object of the invention is to produce a practical device and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the novel lure attaching clip comprises a helically wound body 1 formed from a length of spring steel wire intermediate the ends thereof.

At one end of the body 1 the adjacent end portion of the wire is formed as a relatively short, laterally projecting, but inwardly opening hook 2.

At the opposite end of the body 1 the adjacent end portion of the wire is of greater length and extends laterally a short distance in the same direction as the hook 2, as at 3, and thence turns and extends lengthwise of the body 1 as a spring finger 4.

Figure 1:
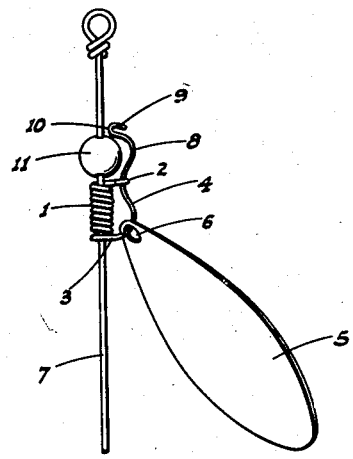
Figure 1 is an elevation of the lure attaching clip as locked for use.
Figure 2:
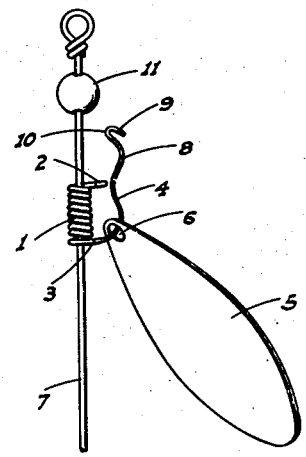
Figure 2 is a similar view but shows the lure attaching clip as released to permit of removal of the lure.
Figure 3:
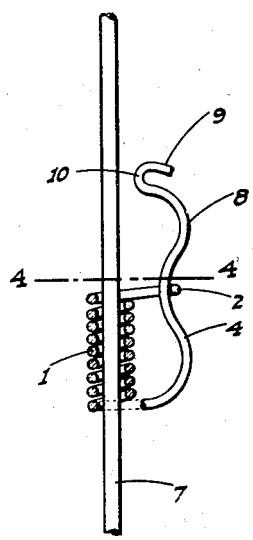
Figure 3 is an enlarged sectional elevation similar to Fig. 1, but without the lure.
Figure 4:
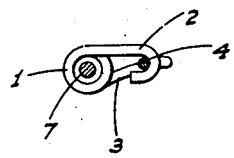
Figure 4 is a cross section on line 4—4 of Fig. 3.

The spring finger 4 is of considerably greater length than the body 1 and thus projects to a termination some distance beyond the hook 2. In its released position the spring finger 4 is disposed laterally out relative to the hook 2, as shown in Fig. 2.

Thus when the spring finger 4 is engaged in the hook 2, it does so with considerable tension.

The lure is here shown as a spinner 5 having an eye 6 formed in its inner end; said spinner 5 being engaged with the clip by projecting the spring finger 4 through the eye 6 and then engaging said finger in the hook 2. When the clip is in use the relatively stiff or resilient shank 7 of a leader extends through the body 1, which body is tubular by reason of its helical configuration.

In order to prevent accidental escape of the spring finger 4 from the hook 2 when the spinner 5 is in use, the following novel arrangement is provided:

Beyond the hook 2 the spring finger is bent to form a laterally outwardly rounded portion or catch 8, and the free end of said catch is turned out, as at 9, to provide a rounded end 10.

When the spring finger 4 is engaged with the hook 2, the rounded end 10 is disposed relatively close to the leader shank 7, there being a bead 11 on said shank then engaged by the rounded catch 8. The diameter of the bead 11 is greater than the open distance between the hook 2 and leader shank 7 so that when the catch 8 is engaged over said bead the spring finger 4 cannot escape said hook 2.

To uncouple or release the device the bead is first snapped out of the catch 8 by shifting it lengthwise along the leader shank 7 away from the body 1. Thereafter the spring finger 4 can be unhooked and the spinner 5 removed from said finger.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device for attaching a lure to a leader, comprising a tubular body adapted to receive the leader therethrough, an inwardly opening hook projecting laterally from the body, and a lure attaching spring finger projecting from the body at a point spaced from the hook and thence extending toward and for tensioned but releasable engagement with the hook; the spring finger being elongated and terminating some distance beyond the hook and adjacent end of the body, and a bead adapted to slide on the leader beyond said end of the body, the free end portion of the finger being formed as an arcuate catch adapted to yieldably engage over the bead to then prevent escape of the finger from the hook.

2. A device for attaching a lure to a leader, comprising a tubular body adapted to receive the leader therethrough, said body being a helically wound wire, an inwardly opening hook projecting laterally from the body, and a lure attaching spring finger projecting from the body at a point spaced from the hook and thence extending toward and for tensioned but releasable engagement with the hook, the hook and the spring finger being formed from opposite end portions of said wire; the spring finger being elongated and terminating some distance beyond the hook and adjacent end of the body, and a bead adapted to slide on the leader beyond said end of the body, the free end portion of the finger being formed as an arcuate catch adapted to yieldably engage over the bead to then prevent escape of the finger from the hook.

CECIL C. COATS.

REFERENCES CITED

The following references are of record in the file of this patent:

UNITED STATES PATENTS

| Number | Name | Date |
|---|---|---|
| 520,594 | Harlow | May 29, 1894 |
| 799,491 | Palmer | Sept. 12, 1905 |
| 843,651 | Willing | Feb. 12, 1907 |
| 1,698,193 | Geer | Jan. 8, 1929 |
| 1,730,333 | Pflueger | Oct. 1, 1929 |
| 2,217,972 | Smith | Oct. 15, 1940 |

FOREIGN PATENTS

| Number | Country | Date |
|---|---|---|
| 852,612 | France | Oct. 30, 1939 |